(12) United States Patent
Carlson et al.

(10) Patent No.: US 7,908,336 B2
(45) Date of Patent: Mar. 15, 2011

(54) DYNAMICALLY INSERTING PREFETCH TAGS BY THE WEB SERVER

(75) Inventors: Michael Pierre Carlson, Austin, TX (US); Srinivas Chowdhury, Temple, TX (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 12/335,181

(22) Filed: Dec. 15, 2008

(65) Prior Publication Data

US 2009/0094417 A1  Apr. 9, 2009

Related U.S. Application Data

(63) Continuation of application No. 10/756,106, filed on Jan. 13, 2004, now Pat. No. 7,483,941.

(51) Int. Cl.
  *G06F 15/16* (2006.01)
  *G06F 12/00* (2006.01)
(52) U.S. Cl. .................... 709/213; 709/250
(58) Field of Classification Search .......... 709/203, 709/217, 218, 223–229, 250, 213
  See application file for complete search history.

(56) References Cited

U.S. PATENT DOCUMENTS

| | | | |
|---|---|---|---|
| 6,023,726 A | 2/2000 | Saksena | |
| 6,067,565 A | 5/2000 | Horvitz | |
| 6,073,168 A * | 6/2000 | Mighdoll et al. | 709/217 |
| 6,085,226 A | 7/2000 | Horvitz | |
| 6,553,393 B1 * | 4/2003 | Eilbott et al. | 715/207 |
| 6,553,461 B1 | 4/2003 | Gupta et al. | |
| 6,606,645 B1 | 8/2003 | Cohen et al. | |
| 6,959,318 B1 * | 10/2005 | Tso | 709/203 |
| 7,130,890 B1 * | 10/2006 | Kumar et al. | 709/218 |
| 2003/0115346 A1 * | 6/2003 | McHenry et al. | 709/229 |
| 2003/0120658 A1 * | 6/2003 | Carneal et al. | 707/10 |
| 2003/0126232 A1 * | 7/2003 | Mogul et al. | 709/219 |
| 2003/0195940 A1 * | 10/2003 | Basu et al. | 709/213 |

OTHER PUBLICATIONS

Fielding, et al., "Hypertext Transfer Protocol-HTTP/1.1", Network Working Group, Jan. 1997, pp. 1-173.

* cited by examiner

*Primary Examiner* — Zarni Maung
(74) *Attorney, Agent, or Firm* — Yee & Associates, P.C.; Mark C. Vallone; Rudolf O. Siegesmund

(57) ABSTRACT

Prefetch tags are embedded in the HTML of a user-requested webpage so that, after delivery of the user-requested webpage to the user, the proxy can cache webpages that the user is likely to request. After the browser issues a request for a webpage to the proxy, the proxy passes the request to the web server. The web server obtains the webpage and embeds prefetch tags into the HTML of the webpage. The selection of prefetch tags is determined by a personalization database or log/statistics database in the web server. The web server sends the user-requested webpage back to the user through the proxy. The proxy reads the prefetch tags and prefetches the webpages identified in the prefetch tags. The webpages identified in the prefetch tags are stored in the proxy cache memory so that they can be quickly sent to the user upon request.

10 Claims, 3 Drawing Sheets

DYNAMICALLY INSERTING PREFETCH TAGS BY THE WEB SERVER

This application is a continuation of application Ser. No. 10/756,106, filed Jan. 13, 2004, status allowed.

FIELD OF THE INVENTION

The present invention is directed generally to a method for improving the rate of loading webpages to a user's computer and specifically to a method for embedding prefetch tags in the HTML of the webpages so that a proxy can prefetch webpages that the user is likely to request.

BACKGROUND OF THE INVENTION

The World Wide Web (web) is one of the most popular mediums for obtaining information. The increasing popularity of the web has resulted in significant growth in the number of web users and thus an increase in web traffic. The increased traffic causes an increase in the time required for a user to request and receive a webpage. Other causes for increases in the time required for a user to request and receive a webpage are network congestion, low bandwidth, bandwidth underutilization, and propagation delay.

Web development engineers have created hardware solutions in an effort to decrease the time required to request and receive a webpage. One example of a hardware solution is an upgrade for the web servers and bandwidth capabilities. Another hardware solution is the use of a proxy between the user and the web server. In the proxy solution, the proxy has a cache memory for storing webpages that the user frequently visits. The time required to load a webpage from the proxy is significantly less than the time required to load a webpage from the web server. If the proxy does not have the webpage stored in cache memory, then the proxy passes the webpage request onto the web server, and then forwards the user-requested webpage back to the user.

Web development engineers have also developed software solutions in an effort to decrease the time required to request and receive a webpage. One of the software solutions is the concept of prefetching webpages. Prefetching is the process of obtaining webpages from the web server that the user has not yet requested. The main idea in prefetching is to prefetch those webpages that the user will most likely request. The prefetching is preformed during the downtime in the bandwidth, i.e. when the user is not requesting or receiving any webpages.

Many of the prior art versions of prefetching are inefficient in terms of bandwidth consumed and accurately perfecting webpages that the user actually requests. For example, when using a typical web search engine, a user enters search criteria and the search engine displays the ten most relevant responses to the search. The search engine also displays a "next" tag that leads the user to the next ten most relevant responses, and so forth. In some embodiments, after the search engine displays the first ten results, the web browser prefetches the webpages for the displayed links and stores the prefetched webpages in the user's computer. In other embodiments, when the user enters a search, the web browser prefetches the webpages for the links that will be displayed by clicking the "next" link and stores the prefetched webpages in the user's computer. Other embodiments exist where the user can configure the prefetching mechanism to prefetch only specific webpages.

One of the problems associated with the prior art prefetch mechanisms is that the criteria for selecting the particular webpages to prefetch is not very accurate in terms of selecting webpages that the user actually requests. The prior art prefetch mechanisms are also not very bandwidth efficient because a multitude of webpages that are never requested are transmitted to the user's computer. Another problem associated with the prior art prefetch mechanisms is that they must be configured by the user and the configuration process is time consuming and confusing to users who are not very computer savvy. Therefore, a need exists for a more bandwidth efficient prefetching mechanism that more accurately prefetches webpages that the user will likely request and that does not have to be configured by the user.

The prior art has previously addressed the issue of creating improved prefetching mechanisms. For example, U.S. Pat. No. 6,085,226 (the '226 patent) entitled "Method and Apparatus for Utility-Directed Prefetching of Webpages into Local Cache Using Continual Computation and User Models" discloses a prefetch mechanism. The prefetch mechanism in the '226 patent uses a user application, such as MICROSOFT® INTERNET EXPLORER®, to prefetch documents that the '226 invention determines the user might request based on the currently viewed webpage. In the '226 invention, the user can turn on a toolbar in INTERNET EXPLORER® so that when the user visits a webpage, a second webpage is loaded into a frame to the left of the browser. The second webpage shows a list of links to the related pages that are prefetched. The '226 patent could then be used to prefetch those links into the cache memory in the browser. The system prefetches the webpages that the system determines the user will want next. However, the prefetch mechanism in the '226 patent runs on the user's computer and consumes an excessive amount of the critical bandwidth between the user and the proxy. Therefore, a need still exists in the art for a prefetch determination mechanism that limits the usage of the bandwidth between the user and the proxy.

U.S. Pat. No. 6,023,726 (the '726 patent) entitled "User Configurable Prefetch Control System for Enabling User to Prefetch Documents for a Network Server" discloses a prefetch mechanism. The prefetch mechanism in the '726 patent discloses a system that determines the webpages to prefetch. After configuring the prefetching mechanism, the '726 invention uses the prefetch weights in the HTML to determine which webpages to prefetch. Alternatively, the prefetching system can use a pathfile from the server to determine which webpages to prefetch. The prefetch weighting and pathfile generation, as described in the '726 patent, would be the same for every user of the server, i.e. anyone who accesses the server will see the same prefetch results. Thus, the prefetch mechanism in the '726 patent is also unable to provide different prefetching mechanisms for different users. In other words, user A will be given the same prefetched webpages as user B, even though user A's and user B's browsing habits are different. The '726 patent also has the same shortcoming as the '226 patent in that both run on the user's computer. Consequently, a need still exists for a prefetch mechanism that runs on the server side of the web and is able to customize the prefetch mechanism to each individual user.

SUMMARY OF THE INVENTION

The present invention, which meets the needs identified above, is a method and system for decreasing the time required for a user to request and receive a webpage. The present invention divides the webpages in the proxy cache memory into two categories: user-requested webpages and prefetched webpages. User-requested webpages are webpages that a user requests from the proxy and that the proxy sends back to the user. Prefetched webpages are webpages that the user has not requested. The proxy obtains the prefetched webpages from the web server and stores the prefetched webpages in cache memory even though the user has not requested the prefetched webpage. The time required for the user to receive a user-requested webpage is substantially reduced when the user-requested webpage is a prefetched webpage.

When the user sends a request for a webpage that is not in the cache memory, the request travels from the browser, through the proxy, to the web server. The web server obtains the user-requested webpage, adds the prefetch tags to the HTML of the user-requested webpage according to criteria in either a personalization database or a log/statistics database, and sends the user-requested webpage to the proxy. The proxy stores the user-requested webpage in the cache memory, and then sends the user-requested webpage to the user. After the proxy sends the user-requested webpage to the user, the proxy requests any prefetched webpages from the web server. The proxy requests a prefetched webpage if the prefetched webpage is identified by a prefetch tag in the HTML of the user-requested webpage. The web server obtains the prefetched webpage requested by the proxy and sends the prefetched webpage back to the proxy. The proxy does not send the prefetched webpage to the user because the user has not requested the prefetched webpage. Instead, the proxy stores the prefetched webpage in cache memory in anticipation of a user request. In an alternative embodiment, the proxy can be located on the user's computer, read the prefetch tags, and prefetch resources during browser idle time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "browser" shall mean a computer program for browsing the World Wide Web.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "log/statistics database" shall mean a database or file of the history and the probability of a user requesting a second webpage from a hyperlink on a first webpage.

As used herein, the term "personalization database" shall mean a database or file located in a web server that contains information regarding the browsing habits of a plurality of users.

As used herein, the term "prefetch" shall mean to obtain a prefetched webpage and store the prefetched webpage in cache memory in the proxy or cache memory of the user's computer.

As used herein, the term "prefetch tag" shall mean computer code that instructs a proxy or a browser to prefetch a webpage.

As used herein, the term "prefetched webpage" shall mean a webpage that a user has not requested but that the proxy or a browser still obtains and stores in cache memory.

As used herein, the term "proxy" shall mean a computer that acts as an intermediary between the user's computer and a web server and that stores webpages in cache memory for access by a user. The proxy may be located either on the user's computer or as a separate piece of hardware.

As used herein, the term "request" shall mean a computer instruction issued from a first computer to a second computer asking that the second computer deliver a specific webpage to the first computer.

As used herein, the term "response" shall mean the delivery of a specific webpage to a first computer from a second computer because of a request issued by the first computer to the second computer.

As used herein, the term "server side" shall mean those computers comprising the World Wide Web excluding those computer used to browse the World Wide Web.

As used herein, the term "user-requested webpage" shall mean a webpage that a user has requested and that the proxy obtains and forwards to the user.

As used herein, the term "webpage" shall mean a resource on the World Wide Web such as a webpage, a picture, a sound clip, or a data file.

As used herein, the term "web server" shall mean a computer that permanently stores a plurality of webpages and that embeds prefetch tags into the HTML of the webpages.

Figure 1:
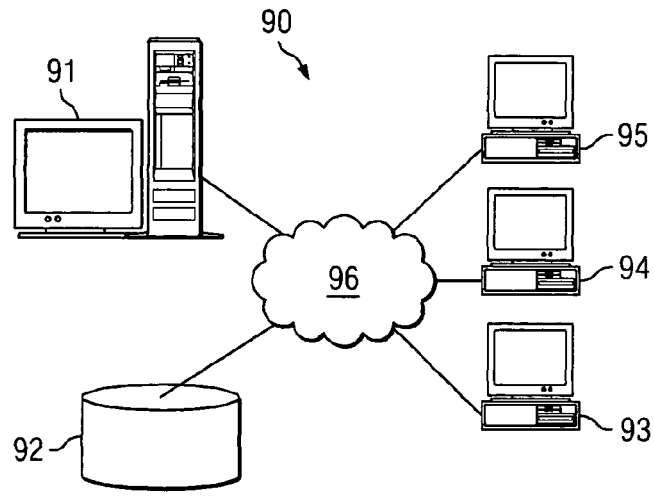
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet or World Wide Web. Furthermore, computer network 90 depicted in FIG. 1 is intended as a representation of a possible operating network containing the present invention and is not meant as an architectural limitation.

Figure 2:
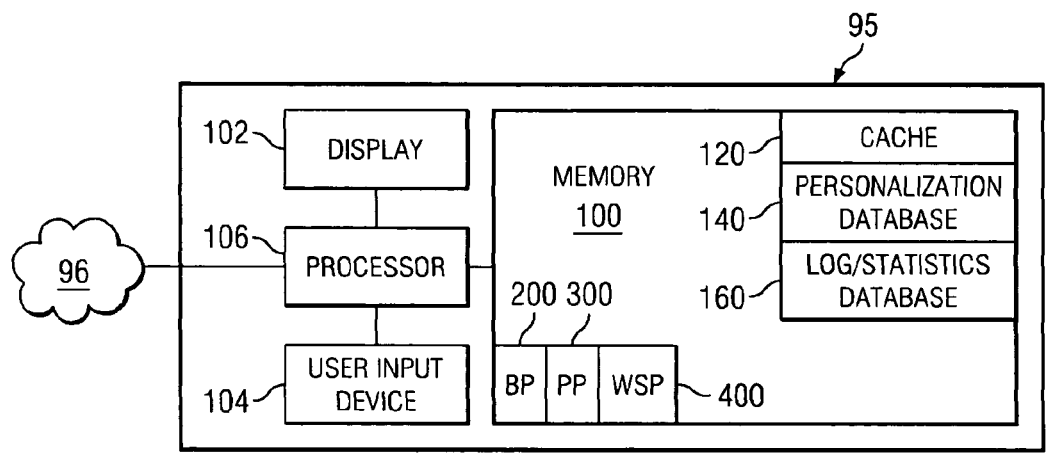
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Browser Program (BP) 200, Proxy Program (PP) 300, and Web Server Program (WSP) 400. BP 200, PP 300, and WSP 400 described herein can be stored within the memory of any computer depicted in FIG. 1. Alternatively, BP 200, PP 300, and/or WSP 400 can be stored in an external storage device such as a removable disk, a CD-ROM, or a USB storage device. Memory 100 is illustrative of the memory within one of the computers of FIG. 1. Memory 100 also contains cache 120, personalization database 140, and log/statistics database 160. The present invention may interface with cache 120, personalization database 140, and log/statistics database 160 through memory 100. As part of the present invention, the memory 100 can be configured with BP 200, PP 300, and/or WSP 400. Processor 106 can execute the instructions contained in BP 200, PP 300, and/or WSP 400. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, BP 200, PP 300, and/or WSP 400 can be stored in the memory of other computers. Storing BP 200, PP 300, and/or WSP 400 in the memory of other computers allows the processor workload to be distributed across a plurality of processors instead of a single processor. Further configurations of BP 200, PP 300, and/or WSP 400 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Figure 3:
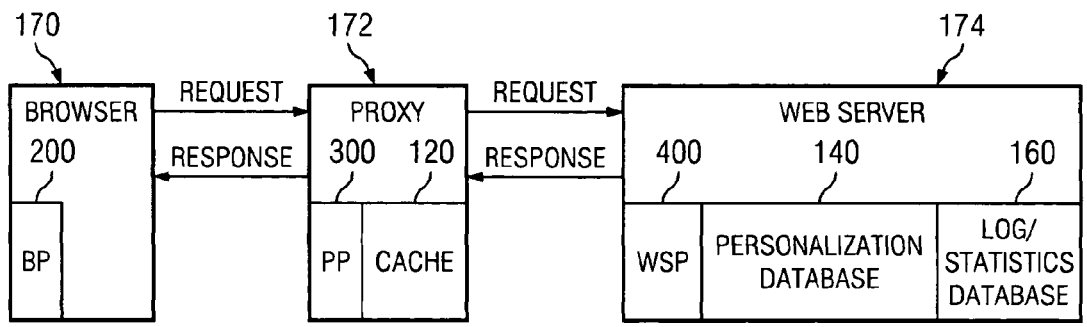
FIG. 3 is an illustration of the interaction of the browser, the proxy, and the web server of the present invention.

FIG. 3 illustrates the interaction of browser 170, proxy 172, and web server 174 of the present invention. Browser 170 operates on a user's computer and runs BP 200 to submit a request for a user-requested webpage to proxy 172. Proxy 172 runs PP 300 when the request is received. If the user-requested webpage is not in cache 120, proxy 172 forwards the request to web server 174. Web server 174 runs WSP 400 upon receipt of the request, adding the prefetch tags to the user-requested webpage. WSP 400 adds the prefetch tags using criteria in either personalization database 140 or log/statistics database 160. Web server 174 then returns the user-requested webpage to proxy 172. Proxy 172 forwards the user-requested webpage to browser 170 and requests the prefetched webpages identified in the prefetch tags. By sending the user-requested webpage to the user before requesting the prefetched webpages identified in the prefetch tags, the present invention is able to prefetch webpages without using the bandwidth between the user's computer and proxy 172, improving the overall time required for a user to request and receive a user-requested webpage. In an alternative embodiment, the proxy can be located on the user's computer, read the prefetch tags, and prefetch resources during browser idle time.

Figure 4:
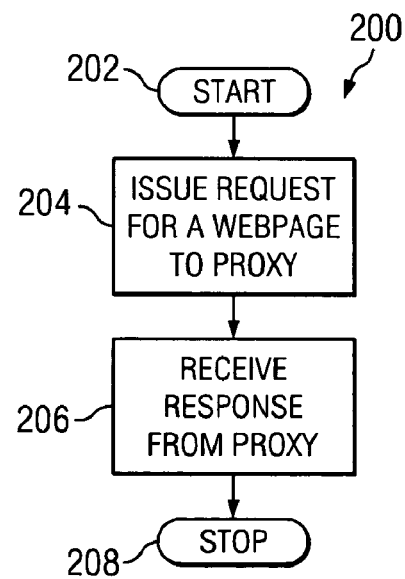
FIG. 4 is an illustration of the logic of the Browser Program (BP) of the present invention.

FIG. 4 illustrates the logic of Browser Program (BP) 200 of the present invention. BP 200 is a program that runs on browser 170 and interacts with proxy 172. BP 200 starts (202) whenever the user wants to browse the World Wide Web. BP 200 issues a request for a user-requested webpage to proxy 172 (204). BP 200 then receives the user-requested webpage from proxy 172 (206). The user-requested webpage contains at least one prefetch tag that allows proxy 172 to provide faster upload time for the next webpage that the user requests. BP 200 then ends (208).

Figure 5:
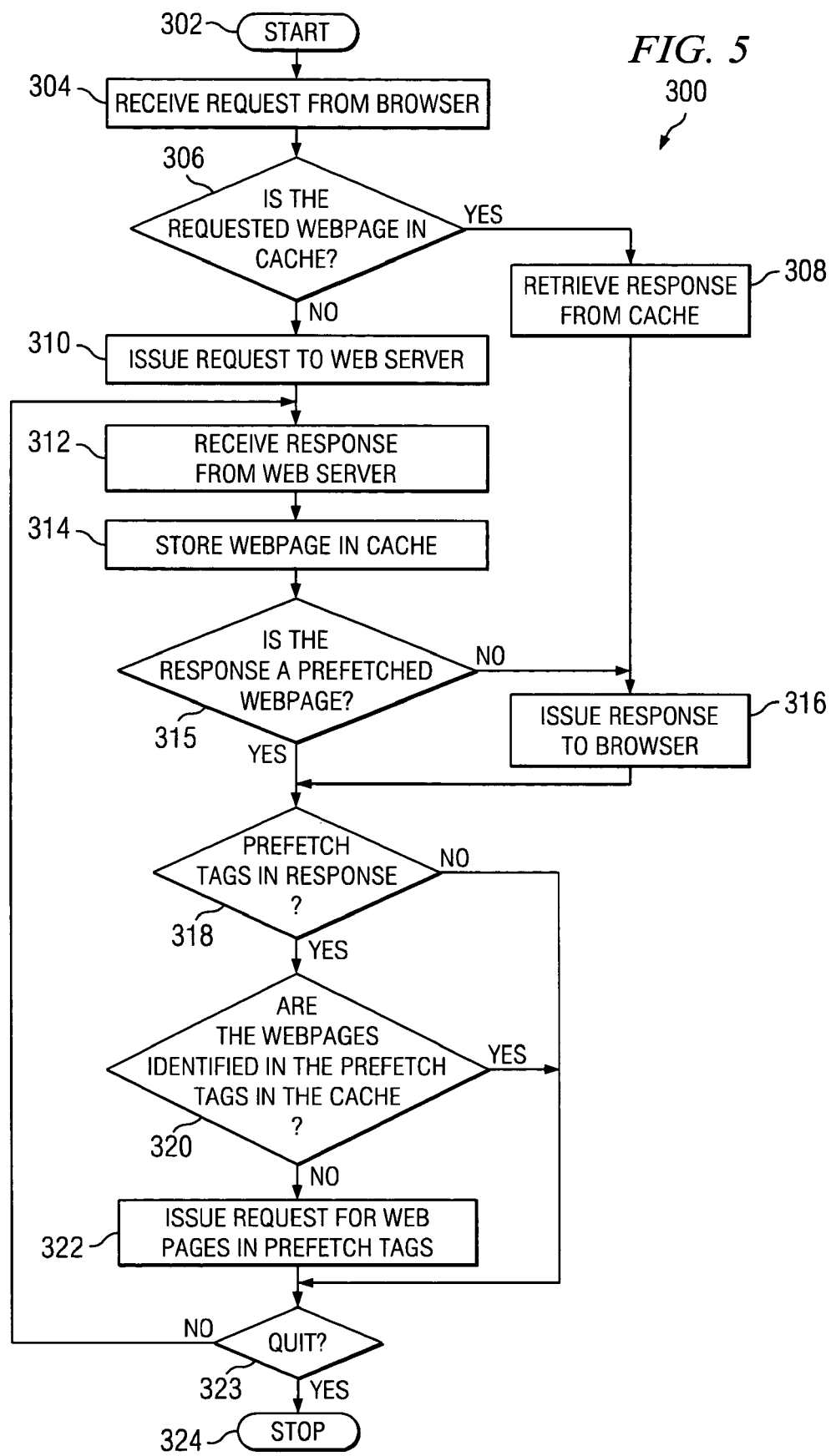
FIG. 5 is an illustration of the logic of the Proxy Program (PP) of the present invention.

FIG. 5 illustrates the logic of Proxy Program (PP) 300 of the present invention. PP 300 is a program that prefetches webpages based on the expected request by the user. PP 300 starts (302) when proxy 172 receives a request for a user-requested webpage from browser 170 (304). PP 300 then determines whether the user-requested webpage is in cache 120 (306). If the user-requested webpage is in cache 120, PP 300 retrieves the user-requested webpage from cache 120 (308) and proceeds to step 316. If the user-requested webpage is not in cache 120, PP 300 issues a request for the user-requested webpage to web server 174 (310). After web server 174 processes the request, PP 300 receives the webpage from web server 174 (312). The webpage received from web server 174 may be either a user-requested webpage or a prefetched webpage, depending on the type of webpage requested from web server 174. PP 300 then stores the webpage received from web server 174 in cache 120 (314). PP 300 then determines whether the response is a prefetched webpage (315). If the response is a prefetched webpage, PP 300 proceeds to step 318. If the response is not a prefetched webpage, PP 300 issues the response to browser 170 (316), then proceeds to step 318.

Proxy 172 may periodically purge some of the webpages in cache 120. Therefore, whenever proxy 172 sends a user-requested webpage to browser 170, proxy 172 needs to check to see if the webpages identified by the prefetch tags in the user-requested webpage are in cache 120. PP 300 determines whether the webpage sent to browser 170 contains any prefetch tags (318). If the webpage sent to browser 170 does not contains any prefetch tags, PP 300 proceeds to step 323. If the webpage sent to browser 170 contains at least one prefetch tag, PP 300 determines whether the webpages identified in the prefetch tags are in cache 120 (320). If the webpages identified in the prefetch tags are in cache 120, PP 300 proceeds to step 323. If the webpages identified in the prefetch tags are not in cache 120, then PP 300 issues a request to web server 174 for the webpages identified in the prefetch tags (322) then proceeds to step 323.

At step 323, PP 300 determines whether to terminate the prefetching process (323). PPP 300 will quit the prefetching process if the user has requested another webpage or the proxy system administrator closes PP 300. If PP 300 determines that the prefetching process should not be terminated, PP 300 returns to step 312. If PP 300 determines that the prefetching process should be terminated, PP 300 ends (324).

Figure 6:
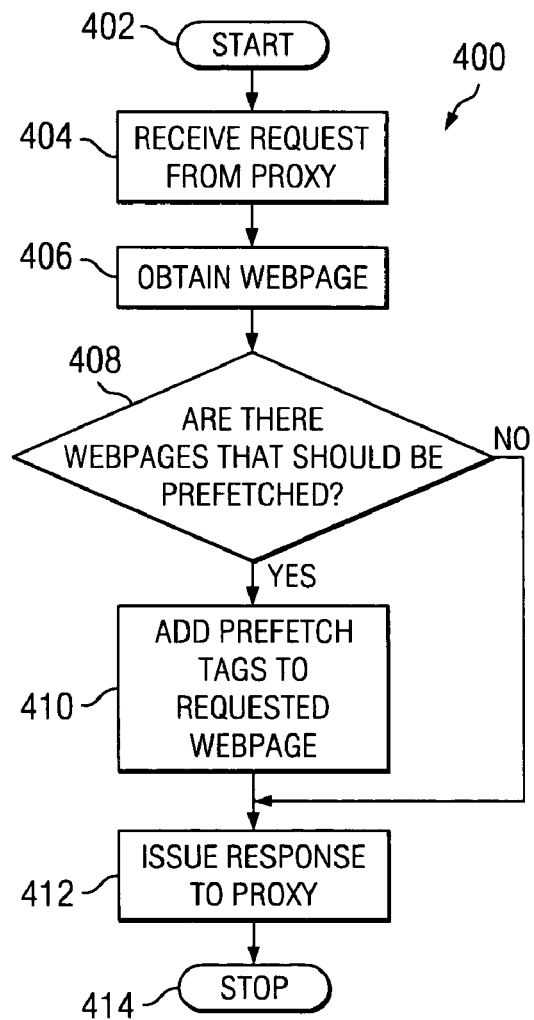
FIG. 6 is an illustration of the logic of the Web Server Program (WSP) of the present invention.

FIG. 6 illustrates the logic of Web Server Program (WSP) 400. WSP 400 is a program that embeds the prefetch tags into the HTML of the webpage. WSP 400 starts (402) when web server 174 receives a request from proxy 172 (404). WSP 400 obtains the webpage from the host server (406). WSP 400 then determines whether there are webpages that should be prefetched (408). A webpage should be prefetched if the webpage meets criteria stored in either personalization database 140 or log/statistics database 160.

Personalization database 140 is a database within web server 174 that records how the user personalizes his home page, contains specific information about the user, and tracks the user's viewing history. The specific information about the user may be information such as whether the user's computer accepts Japanese, whether the user accesses the World Wide Web from Europe, whether the user does not read Spanish, and so forth. The present invention takes advantage of the information in personalization database 140 by cross referencing the hyperlinks in the user-requested webpage with the user preferences and configuration data in personalization database 140. If the webpage or metadata in the hyperlink of the user-requested webpage matches the webpage or metadata in personalization database 140, then WSP 400 marks the hyperlink of the user-requested webpage as identifying a webpage that needs to be prefetched.

Similar to personalization database 140, log/statistics database 160 contains criteria that may indicate that a webpage needs to be prefetched. Log/statistics database 160 is a log of all of the requests made to web server 174 and a database of the statistics regarding every webpage accessed by web server 174. More specifically, log/statistics database 160 contains a list of the frequency of use of every hyperlink in all of the webpages, both by the specific user and by all other users.

Log/statistics database 160 tracks each specific user's history and determines the probability that the specific user will access a certain webpage. Thus, log/statistics database 160 states that when user X goes to webpage A containing hyperlinks B and C, there is a seventy percent chance the user will later access webpage B, and there is a forty percent chance that the user will later access webpage C. Log/statistics database 160 may perform a similar analysis for all other users and determine what the probability across all users of a user requesting a webpage. The criteria in log/statistics database 160 determine that a webpage needs to be prefetched if the statistical data exceeds a predetermined threshold, such as a seventy percent probability.

If WSP 400 determines that there are not any webpages that need to be prefetched, then WSP 400 proceeds to step 412. If WSP 400 determines that there are webpages that need to be prefetched, then WSP 400 adds the prefetch tags to the HTML of the user-requested webpage (410). WSP 400 can add the prefetch tags to the HTML hyperlink or to the webpage meta header. An example of the addition of the prefetch tag to the HTML link element is:

```
<head>
    <link rel="prefetch" href="/content/abc.html">
</head>
```

An example of the addition of the prefetch tag to the webpage meta header is:
<meta HTTP-EQUIV="Link" CONTENT="</content/abc.html>; rel=prefetch">
The link format may be the same as the format described in section 19.6.2.4 of the publication "Hypertext Transfer Protocol—HTTP/1.1" by Fielding, et al. WSP 400 then issues the response to proxy 172 comprising the user-requested webpage with the embedded prefetch tags (412) and ends (414).

The present invention runs entirely on the server side (i.e. not on the user's computer). No user configuration is necessary and no additional storage space is required on the user's computer. This present invention determines the pages to prefetch based on user-specific usage patterns as well as any other specific user preferences available to the web server such as whether the user's computer accepts Japanese, whether the user accesses the World Wide Web from Europe, whether the user does not read Spanish, and so forth. The invention uses the user-specific usage patterns to determine which hyperlinks in the webpage to add a prefetch tag. An example of a link tag with prefetch markup is:
<link rel="prefetch" href="/whatsNew.html">
Proceeding with the above example, the present invention may determine that user A only rarely accesses the /whatsNew.html page. Therefore, when user A accesses a page that contains a link to whatsNew.html, user A gets a hyperlink without the prefetch tag in the HTML:
<link href="/whatsNew.html">
For user B, the present invention may determine that user B frequently accesses the /whatsNew.html page. Therefore, user B receives a webpage from the web server that contains a hyperlink containing the prefetch tag:
<link rel="prefetch" href="/whatsNew.html">
For user C, the present invention may determine that user C only accesses the /whatsNew.html page on Mondays. Therefore, the present invention will issue the webpage containing the prefetch tag to the user on Mondays, and issue the webpage without the prefetch tag to the user on other days.

Persons of ordinary skill in the art will appreciate that the concept of creating user-specific prefetch tags is expandable from the examples depicted herein based upon other data known about the user. For example, if the web server knows that the user does not accept Japanese content and that /whatsNew.html is in Japanese, then the present invention would not issue the prefetch markup for the link. Similar expansions on the concepts presented herein will be known to persons of ordinary skill in the art.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method comprising:
   receiving, by a proxy from a web server, a webpage containing an instruction added to the webpage by the web server in response to receiving a request from a web browser on a computer for the webpage, wherein the webpage is not in a cache memory of the proxy and a hyperlink in the webpage matches one or more preferences in a database operably coupled to the web server;
   forwarding, by the proxy, the webpage to the web browser on the computer; and
   obtaining, by the proxy, a prefetched webpage associated with the hyperlink from the web server in accordance with the instruction, wherein the instruction is configured to cause the proxy to obtain and store, in the proxy cache memory, the prefetched webpage, associated with the hyperlink, only in response to the proxy having forwarded the webpage to the web browser.

2. The method of claim 1 further comprising:
   purging, by the proxy, the prefetched webpage from the proxy cache memory on a periodic basis.

3. The method of claim 1 further comprising:
   determining, by the proxy, whether the prefetched webpage is stored in the proxy cache memory prior to obtaining, by the proxy, the prefetched webpage associated with the hyperlink from the web server in accordance with the instruction;
   performing a step of obtaining, by the proxy, the prefetched webpage associated with the hyperlink from the web server in accordance with the instruction responsive to determining that the prefetched webpage is not stored in the proxy cache memory.

4. The method of claim 1, wherein the hyperlink matches one or more configurations in the database in addition to the one or more preferences.

5. A computer system comprising:
   a CPU, a computer-readable memory and a computer-readable, tangible storage device;
   program instructions, stored on the computer-readable, tangible storage device for execution by the CPU via the computer-readable memory, to determine whether a hyperlink in a webpage matches one or more criteria in a database;
   program instructions, stored on the computer-readable, tangible storage device for execution by the CPU via the computer-readable memory, to add an instruction to the web page responsive to determining that the hyperlink in the webpage matches the one or more criteria in the database, wherein the instruction is configured to cause a proxy to obtain and store, in a proxy cache memory of the proxy, a prefetched webpage associated with the hyperlink, only in response to the proxy having forwarded the webpage to a web browser; and program instructions, stored on the computer-readable, tangible storage device for execution by the CPU via the computer-readable memory, to send the web page to the proxy responsive to adding the instruction to the web page.

6. The system of claim 5 further comprising:

program instructions, stored on the computer-readable, tangible storage device for execution by the CPU via the computer-readable memory, to record, in the database, a plurality of user preferences and a plurality of user configuration data, wherein the user preferences comprise a viewing history and the plurality of user configuration data comprises a frequency of access for the hyperlink.

7. The system of claim 5, wherein the criteria is selected from a group consisting of user preferences and a probability that the hyperlink will be accessed.

8. A computer program product comprising a computer-readable, tangible storage device(s) and computer-readable program instructions stored on the computer-readable, tangible storage device(s) to prefetch a first web page, when executed by a CPU:

determine whether a hyperlink in a second web page matches one or more criteria in a database, wherein the hyperlink refers to the first web page;

add an instruction to the web page responsive to determining that the hyperlink in the webpage matches the one or more criteria in the database, wherein the instruction is configured to cause a proxy to obtain and store, in a proxy cache memory of the proxy, a prefetched webpage associated with the hyperlink, only in response to the proxy having forwarded the webpage to a web browser; and send the web page to the proxy responsive to adding the instruction to the web page.

9. The computer program product of claim 8, further comprising computer-readable program instructions which are stored on the computer-readable, tangible storage device(s) and when executed by a CPU:

record, in the database, a plurality of user preferences and a plurality of user configuration data, wherein the user preferences comprise a viewing history and the plurality of user configuration data comprises a frequency of access for the hyperlink.

10. The computer program product of claim 8, wherein the criteria is selected from a group consisting of user preferences and a probability that the hyperlink will be accessed.

* * * * *